Sheet 1-3 Sheets.

S. L. Chase,

Cooking Stove,

No. 35, Reissued Aug. 11, 1841.

Sheet 2-3 Sheets.
S. L. Chase,
Cooking Stove,
No. 35. Reissued Aug. 11, 1841.
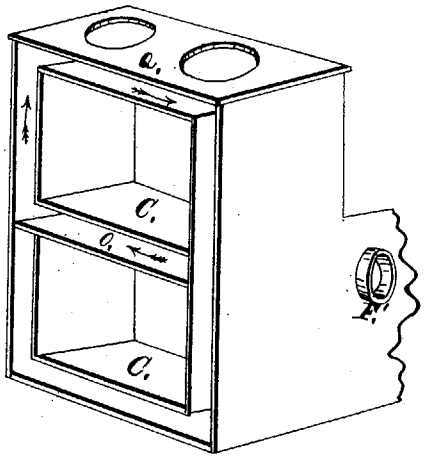
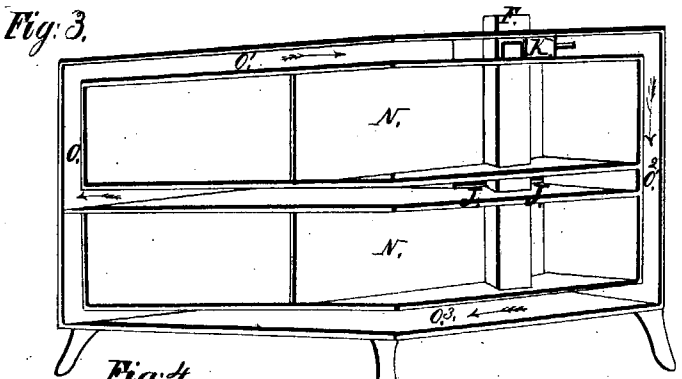
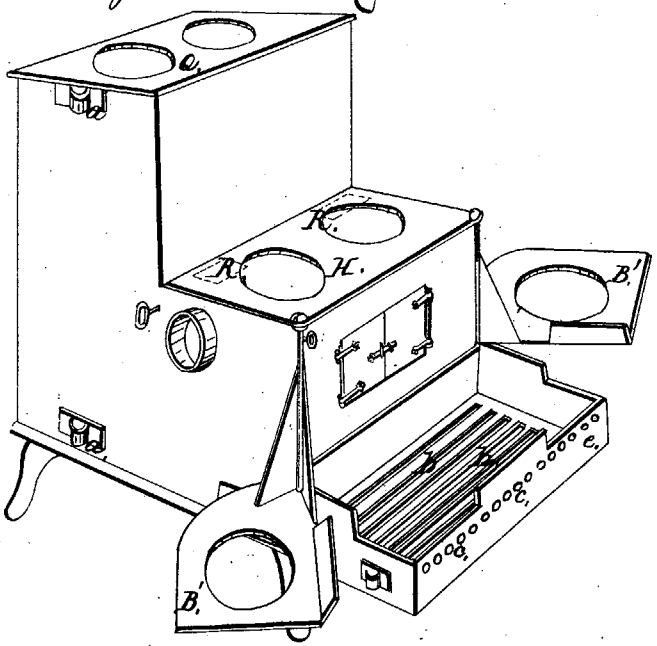
N. PETERS, PHOTO-LITHOGRAPHER, WASHINGTON, D. C.

Sheet 3 - 3 Sheets.

S. L. Chase,

Cooking Stove,

No. 35, Reissued Aug. 11, 1841.

UNITED STATES PATENT OFFICE.

SAMUEL L. CHASE, OF WOODSTOCK, VERMONT.

IMPROVEMENT IN COOKING-STOVES.

Specification forming part of Letters Patent No. 1,799, dated September 25, 1840; Reissue No. 35, dated August 11, 1841.

*To all whom it may concern:*

Be it known that I, SAMUEL LOGAN CHASE, of Woodstock, in the county of Windsor and State of Vermont, have invented a new and useful improvement in the manner of constructing stoves for cooking and for warming apartments, which stove I denominate the "Rarefier Cooking-Stove;" and I do hereby delare that the following is a full and exact description thereof.

I sometimes construct my stoves with two and sometimes with four ovens, depending upon the extent of cooking which it is intended they shall be capable of performing; but whether containing two or four ovens the main principle or mode of operation upon which my improvement is founded remains unchanged.

Figure 1:
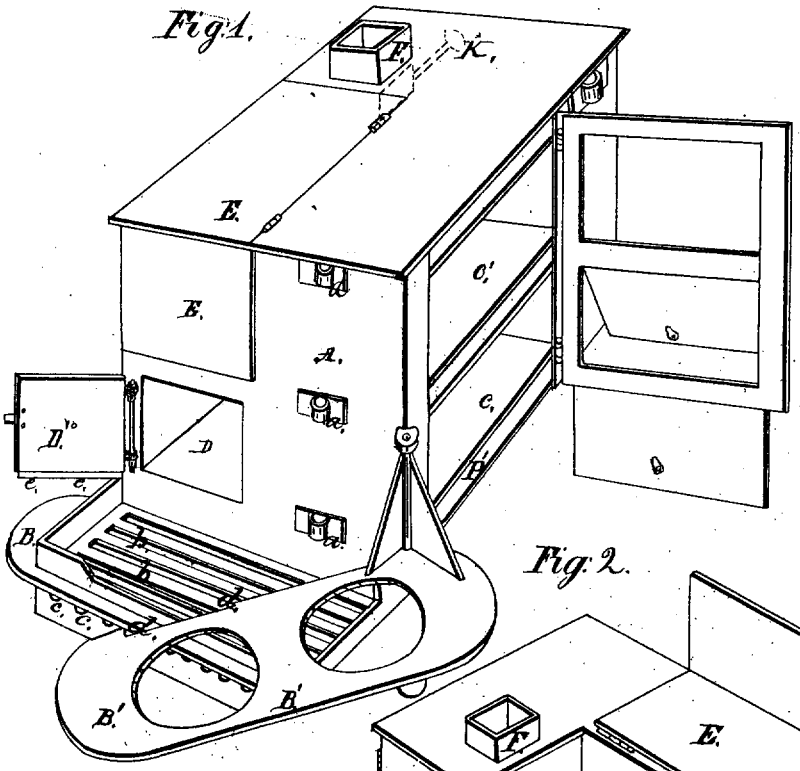

Figure 1 in the accompanying drawings is a perspective representation of one of my four-oven stoves, A being the front plate, B the hearth, C C′ two of the ovens, the doors of which are removed, and D the fire-chamber. E is a hinged cover that incloses a compartment in which boilers or other cooking-utensils may be placed, there being a perforated plate to receive them immediately over the fire-chamber, as in most other cooking-stoves. The other two ovens are at the back end of the stove on a level with C C′, and extending in length the width of the stove. Below the bottom plate, D, of the fire-chamber is the compartment that I denominate the "rarefier," which compartment constitutes a part of the flue through which the heated air is to pass before its exit through the stove-pipe, and after it has traversed the respective flues which surround the ovens. *a a a* are stoppers that may be removed for cleaning these flues. The hearth B has a sink in it for containing coals, and is furnished with bars *b b*, and over these there is a swinging hearth, B′, furnished with boiler-holes, as represented. This swinging hearth I generally divide into two parts in the manner represented in my two-oven stove, Fig. 4, it being thus rendered more convenient and manageable. *c c c* are holes admitting air to the coals within the sink in the hearth, by which combustion may be kept up when the swinging hearth is in place and the boiler-openings in it covered. There is a notch, *d d*, in the back edge of this hearth, which notch, when the swinging hearth and furnace-door D′ are closed, is embraced by a sloping projection, *e e*, on the furnace-door or on the swinging hearth, which constitutes a flue from the sunk hearth into the chamber of combustion, through which vapor and smoke may pass. F is the stove-pipe or escape-flue passing down through the two back ovens and connecting below with the rarefier.

Figure 2:
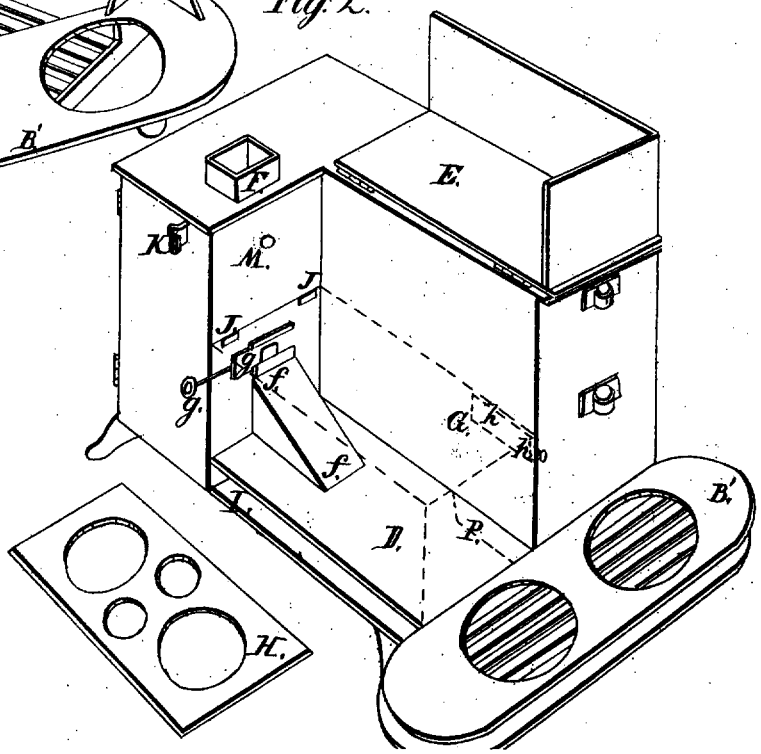

Fig. 2 shows the stove with one of the side plates removed, exhibiting the interior of the chamber of combustion, its top or boiler plate H and the door D′, leading into it, being also removed. D is its bottom, and G its back plate. I I is the flue-space, denominated the "rarefier," and from this there is a passage into the flue F through an inclined flue, *f f*, at the rear end of the fire-chamber. *g g* is a damper to regulate an opening leading directly into the flue F, which is to be opened when the ovens are not to be heated. The draft of heated air, after circulating around the oven-flues, is admitted into that denominated the "rarefier" through an opening, (shown by dotted lines and marked P,) which opening leads into it from the flue below under the lower side oven. J J are two openings through which the heated air from the fire is to pass when the ovens are to be used. Both these openings lead directly into the flue-space between the lower and the upper ovens and on each side of the flue F. These openings may also be furnished with dampers, if preferred; but when the damper *g* is opened for the direct draft there will be little tendency to a draft through these openings. Sometimes, also, I make an opening at *h h* in the front upper right-hand corner of the chamber of combustion, which opening I govern by a damper, as in the two-oven stove, to be presently described. This, when opened, will allow the heated air to pass directly into the flue between the two side ovens without passing the whole circuit of the flues. K is the handle of the damper, (shown by dotted lines,) which damper, when open, leaves a communication from the flue above the ovens into the escape-flue F. The effect of opening this damper is to cause the draft to circulate around the upper ovens only. M is an opening from the boiler-chamber into the flue F, which, when the cover E is turned down so as to close said space, allows the steam to escape into the flue F.

I will now show the course of the draft when the ovens are all in use, and from this the modifications produced by the respective dampers will be apparent.

Figure 3:
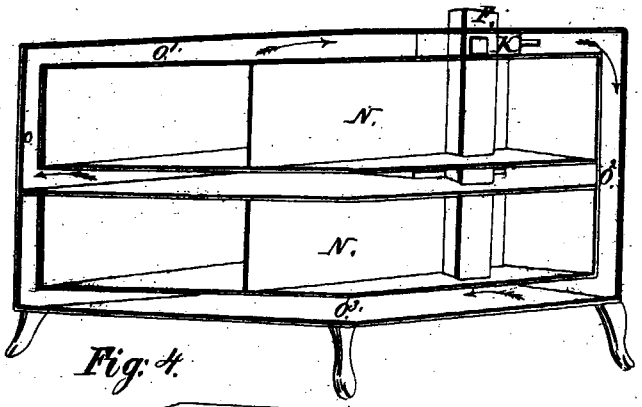

Fig. 3 is a view of the back end and of the oven side of the stove (the outer plates and oven-doors being removed to show the arrangement) and the course of the draft through the flues, as indicated by the arrows. J J are the two passages from the fire-chamber into the flue between the upper and the lower ovens; and I will here observe that this flue, and those also above the upper and below the lower oven, extend uninterruptedly between, over, and above the back and side ovens conjointly, just as though the two lower ovens were also similarly connected. These ovens, however, are divided by the partition-plates N N′. From the openings J J the draft passes along between the upper and the lower ovens to the end flue O, thence to and along the upper flue, O′, thence to the end descending flue $O^2$, thence to the bottom flue, $O^3$, and along this to the opening P from the fore end of said flue into the rarefier or flue under the fire-chamber. In this the air is reheated, and consequently rarefied, serving not only to promote the draft, but adapting the air to the purpose of heating any apartment through which the flue F may be carried in a very effective manner.

Figure 4:
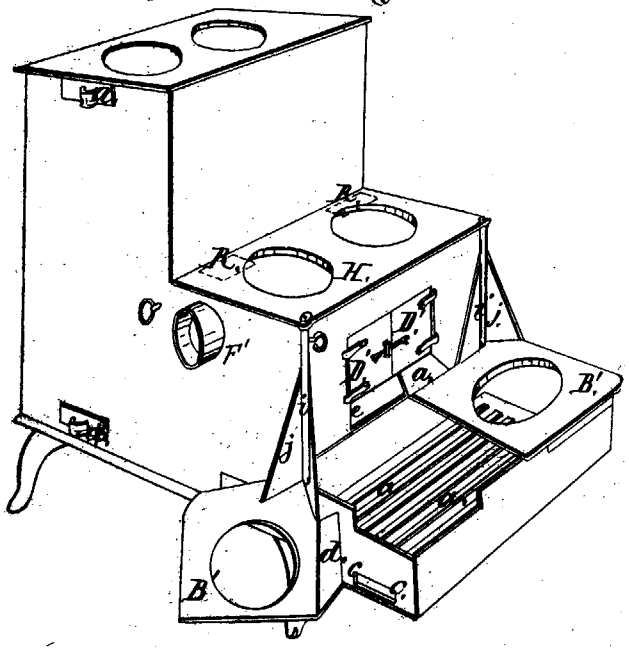

Fig. 4 is a perspective view of a stove of the same kind, but with two ovens only. The sunk hearth, the swinging hearth, the apparatus for broiling, &c., are constructed substantially in the same manner as in the stove already described. The swinging hearth B′ B′ is divided into two parts, as before indicated, so that the two halves may be turned back against the sides of the stove and the bars *b b* left free and unincumbered when desired. The doors D′ D′ of the fire-chamber do not reach to the bottom of the opening into said chamber, but leave a space, *e*, which is uncovered when the swinging hearth is turned back. *d d* are portions of the swinging hearth which rise up from it, so as to inclose the space *e* when the two portions of the hearth are made to cover the bars *d d*. They then form a flue through which the smoke and vapors pass from the sunk hearth into the fire-chamber. Below the bars *d d* in the sunk hearth there is an opening, *c c*, at each end of it, to admit a draft of air to the coals when both the boiler-holes in the sunk hearth are covered. A cover or stopper like those shown at *a a* is adapted to these openings, and the draft may be admitted at either end or at both ends, as may be desired. To support the swinging hearth it is cast with vertical bars *i i* and wing or brace pieces *j j*, the bars *i i* entering suitable holes above and below, upon which the hearth-pieces may swivel. The boiler-plate H may be inclosed by a cover, like that marked E in the four-oven stove; but this may be omitted, and it is not so represented. The top plate, Q, is shown as having boiler-holes; but these may be omitted, as they are in the four-oven stove. The rarefier under the fire-chamber is similar to that under the four-oven stove, the draft passing into it exactly in the same way after having circulated around the flues of the two ovens. The lowermost of these two ovens is on a level with and immediately behind the fire-chamber and the other directly above it. The heated air from the fire-chamber is admitted into the flue between these two ovens through openings R R, leading from it into the flue-space between the two ovens, which openings I regulate by dampers.

Figure 5:
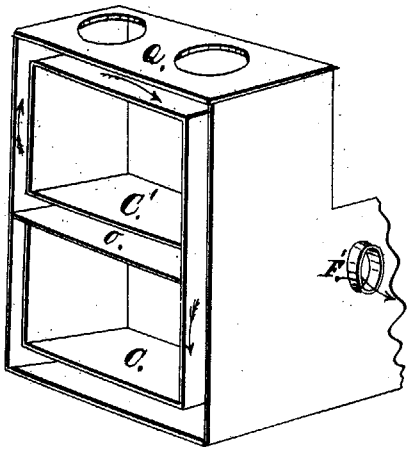

Fig. 5 is a back view of this stove, the back plate, with the oven-doors, which it sustains, being removed to show the course of the flues and of the draft. C C′ are the lower and the upper ovens; O, the middle oven-flue, into which the heated air passes from the fire-chamber through the openings R R, after which it traverses in the direction of the arrows and escapes from the lower flue into the rarefier, and thence by a device analogous to the flue *f f* in the four-oven stove finds its way to the exit-pipe F′, operating in all respects in the same way with it.

Having thus fully described the nature of my improvement and shown how the same is carried into operation, and having in so doing shown and described many parts and devices of which I do not claim to be the inventor, I now proceed to state what I do claim and desire to secure by Letters Patent, viz:

1. The manner in which I have combined and arranged the flues, including the rarefier, as set forth—that is to say, the admitting the heated air from the fire-chamber into the flue between the upper and the lower ovens, conducting it thence through the flue at one end to the flue under the lower oven, thence into the rarefying-flue under the fire-chamber, and thence into the exit-pipe, all substantially as herein made known and represented.

2. In combination, the arrangement of the respective parts of the hearth for broiling and other cooking operations, which arrangement consists of the sunk hearth furnished with the bars *b b*, the openings *c c* for the admission of air, the swinging hearth, and the flue formed by the notch in said hearth, and the sloping projection at the lower edge of the furnace-door or on the swinging hearth.

3. The swinging hearth, in combination with the sunk hearth, whether the said swinging hearth be made in one or in two parts, such swinging hearth constituting, when closed, the top or cover of the sunk hearth, and being provided with boiler-holes, and otherwise constructed and arranged as set forth.

Witnesses: SAML. L. CHASE.

THOS. P. JONES,

ALEXANDER F. BEAN.